(12) United States Patent
Fujii et al.

(10) Patent No.: US 9,871,580 B2
(45) Date of Patent: Jan. 16, 2018

(54) TRANSMISSION APPARATUS AND NETWORK CONTROL METHOD

(71) Applicant: FUJITSU LIMITED, Kawasaki-shi, Kanagawa (JP)

(72) Inventors: Yasuki Fujii, Kawasaki (JP); Takao Naito, Musashino (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/095,476

(22) Filed: Apr. 11, 2016

(65) Prior Publication Data

US 2016/0308604 A1  Oct. 20, 2016

(30) Foreign Application Priority Data

Apr. 20, 2015 (JP) .................. 2015-086313

(51) Int. Cl.
| | |
|---|---|
| *H04B 10/038* | (2013.01) |
| *H04B 10/032* | (2013.01) |
| *H04B 10/035* | (2013.01) |
| *H04B 10/275* | (2013.01) |
| *H04J 14/02* | (2006.01) |

(52) U.S. Cl.
CPC ......... *H04B 10/038* (2013.01); *H04B 10/032* (2013.01); *H04B 10/035* (2013.01); *H04B 10/275* (2013.01); *H04J 14/0283* (2013.01); *H04J 14/0287* (2013.01); *H04J 14/0295* (2013.01)

(58) Field of Classification Search
None
See application file for complete search history.

(56) References Cited

U.S. PATENT DOCUMENTS

| | | |
|---|---|---|
| 2013/0028592 A1 | 1/2013 | Fujii et al. |
| 2013/0051787 A1 | 2/2013 | Tochio |
| 2013/0259473 A1 | 10/2013 | Fujii |

FOREIGN PATENT DOCUMENTS

| | | |
|---|---|---|
| JP | 2013-30884 | 2/2013 |
| JP | 2013-46269 | 3/2013 |
| JP | 2013-211798 | 10/2013 |

*Primary Examiner* — Darren E Wolf
(74) *Attorney, Agent, or Firm* — Staas & Halsey LLP

(57) ABSTRACT

A transmission apparatus being one of a plurality of transmission apparatuses included in a ring network, including: a processor configured to: receive a specified message from a first transmission apparatus, the specified message being for setting loopback for at least one wavelength in a ring network, the specified message being transmitted when a failure of at least one optical signal having the at least one wavelength is detected in a specified link of the ring network, and set a loopback to a switch, the loopback being set for a specified wavelength of the at least one wavelength when a specified optical signal having the specified wavelength is terminated by the switch and converted to an electrical signal and when the specified optical signal having the specified wavelength is not terminated and not converted to an electrical signal by any apparatus from a second transmission apparatus to the specified link.

12 Claims, 14 Drawing Sheets

FIG. 3

| WAVELENGTH | TRANSMISSION APPARATUS 100/TRANSMISSION LINE 300 ⌐120 | | | | | | | |
|---|---|---|---|---|---|---|---|---|
| | 100a | 300a | 100b | 300b | 100c | 300c | 100d | 300d |
| $\lambda_1$ | 1 | 0 | 1 | 0 | 1 | -1 | 1 | 0 |
| $\lambda_2$ | 1 | 0 | 1 | 0 | 0 | -1 | 1 | 0 |
| $\lambda_3$ | 1 | 0 | 0 | 0 | 0 | -1 | 1 | 0 |

FIG. 4

| WAVELENGTH | CONFIGURATION INFORMATION |
|---|---|
| $\lambda_1$ | 1 |
| $\lambda_2$ | 1 |
| $\lambda_3$ | 0 |

FIG. 9

| APS1 | | | | | | | | APS2 | | | | | | | | APS3 | | | | | | | | APS4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| BRIDGE REQUEST | | | | | STATUS | | | DESTINATION NODE ID | | | | | | | L/S | SOURCE NODE ID | | | | | | | T/H | PCC BYTE | | | | | | | |

FIG. 13A

| WAVELENGTH | TRANSMISSION APPARATUS (100)/TRANSMISSION LINE (300) | | | | | | | | | | | |
|---|---|---|---|---|---|---|---|---|---|---|---|---|
| | 100a | 300a | 100b | 300b | 100c | 300c | 100d | 300d | 100e | 300e | 100f | 300f |
| $\lambda_1$ | 1 | -1 | 1 | 0 | 1 | -1 | 1 | 0 | 1 | 0 | 1 | 0 |
| $\lambda_2$ | 1 | -1 | 1 | 0 | 0 | -1 | 1 | 0 | 1 | 0 | 0 | 0 |
| $\lambda_3$ | 1 | -1 | 0 | 0 | 1 | -1 | 0 | 0 | 1 | 0 | 0 | 0 |

FIG. 13B

| WAVELENGTH | TRANSMISSION APPARATUS (100)/TRANSMISSION LINE (300) | | | | | | | | | | | |
|---|---|---|---|---|---|---|---|---|---|---|---|---|
| | 100a | 300a | 100b | 300b | 100c | 300c | 100d | 300d | 100e | 300e | 100f | 300f |
| $\lambda_1$ | 1 | 0 | 1 | 0 | 1 | -1 | 1 | 0 | 1 | -1 | 1 | 0 |
| $\lambda_2$ | 1 | 0 | 0 | 0 | 0 | -1 | 1 | 0 | 1 | -1 | 0 | 0 |
| $\lambda_3$ | 1 | 0 | 0 | 0 | 0 | -1 | 1 | 0 | 1 | -1 | 0 | 0 |

FIG. 14

| WAVELENGTH | TRANSMISSION APPARATUS100 (120a) | | | |
|---|---|---|---|---|
| | 100a | 100b | 100c | 100d |
| $\lambda_1$ | 1 | 1 | 1 | 1 |
| $\lambda_2$ | 1 | 1 | 0 | 1 |
| $\lambda_3$ | 1 | 0 | 0 | 1 |

TRANSMISSION APPARATUS AND NETWORK CONTROL METHOD

CROSS-REFERENCE TO RELATED APPLICATION

This application is based upon and claims the benefit of priority of the prior Japanese Patent Application No. 2015-086313, filed on Apr. 20, 2015, the entire contents of which are incorporated herein by reference.

FIELD

The embodiments discussed herein are related to a transmission apparatus, and a network control method for network protection.

BACKGROUND

With recent increase in capacity of network, wavelength multiplexing network using an optical transport network (OTN, ITU-T G.709) technology has been commercialized.

In a protection method of the wavelength multiplexed OTN ring according to the ITU-T G.873.2, when a failure occurs in a certain link (transmission line), both end nodes (transmission apparatuses) of the failure link each detect the failure, and send a switch message to a link on the opposite side of the failure link. The switch message is a message to inform each node of switching a transmission direction of an optical signal.

The switch message has destination information on the other end node of the failure link. A node between both end nodes transfers the message as it is, and the message eventually reaches the other end node of the failure link. When receiving the message, the other end node of the failure link recognizes that the destination is the own node, and performs switching.

In a wavelength multiplexed ring network, the message for this protection operation is sent separately for each wavelength. However, when the number of multiplexed wavelengths increases, the number of switch messages sent among nodes increases, and a processing load in each node increases. This may delay a recovery from the failure.

In view of this, there is a technique called group protection in which, when a failure occurs in a link in the ring network, a plurality of wavelengths are regarded as one group, and one switch message is transmitted in the unit of group. According to this technique, when a failure occurs in the wavelengths in a group, one switch message is transmitted in the unit of group, and thus the transmission directions of optical signals of all the wavelengths are switched together by the end node of the link. This reduces the number of switch messages transmitted and received by the nodes.

Related techniques are disclosed in, for example, Japanese Laid-open Patent Publication Nos. 2013-030884 and 2013-046269.

SUMMARY

According to an aspect of the invention, a transmission apparatus being one of a plurality of transmission apparatuses included in a ring network, the transmission apparatus includes a switch configured to: transmit each of a first plurality of optical signals received from a first transmission apparatus to a second transmission apparatus, each of the first plurality optical signals having each of a plurality of wavelengths, the first transmission apparatus and the second transmission apparatus being included in the plurality of transmission apparatuses, the first transmission apparatus being one adjacent transmission apparatuses of the transmission apparatus in the rig network, the second transmission apparatus being another adjacent transmission apparatuses of the transmission apparatus in the ring network, and a processor configured to: receive a specified message from the first transmission apparatus, the specified message being for setting loopback for at least one wavelength in the ring network, the specified message being transmitted when a failure of at least one optical signal having the at least one wavelength is detected in a specified link of the ring network, the at least one wavelength being included in the plurality of wavelengths, and set a loopback to the switch, the loopback being set for a specified wavelength of the at least one wavelength when a specified optical signal having the specified wavelength is terminated by the switch and converted to an electrical signal and when the specified optical signal having the specified wavelength is not terminated and not converted to an electrical signal by any apparatus from the second transmission apparatus to the specified link in which the failure is detected, wherein after the loopback is set for the specified wavelength, when receiving an optical signal having the specified wavelength from the first transmission apparatus, the switch is configured to switch a wavelength of the received optical signal from the specified wavelength to a different wavelength and transmit an optical signal, corresponding to the received optical signal, having the different wavelength to the first transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view illustrating an example of configuration of a ring network;

FIG. 2 is a view illustrating a first example of configuration of a transmission apparatuses;

FIG. 3 is a view illustrating an example of a ring information table;

FIG. 4 is a view illustrating an example of a transmission-apparatus configuration information table;

FIG. 5 is a view illustrating a second example of the configuration of the transmission apparatuses;

FIG. 6 is a view illustrating an example of configuration of a ring network;

FIG. 7 is a view illustrating an example in the case where a failure occurs in the ring network;

FIG. 8 is a view illustrating an example of a flowchart of a control unit;

FIG. 9 is a view illustrating an example of an APS signal;

FIG. 10A is a view illustrating an example of a case where double failures occur in a ring network;

FIG. 10B is a view illustrating the example of the case where the double failures occur in the ring network;

FIG. 11 is a view illustrating an example of a flowchart of a method of setting loopback until a switch message is transmitted;

FIG. 12 is a view illustrating an example of a case where triple failures occur in a ring network;

FIG. 13A is a view illustrating an example of a ring information table of the transmission apparatuses in the ring network;

FIG. 13B is a view illustrating an example of a ring information table of the transmission apparatuses in the ring network; and FIG. 14 is a view illustrating an example of a ring information table in Embodiment 4.

DESCRIPTION OF EMBODIMENTS

Some configuration of the ring network, however, has a problem that when a switch message is sent in the unit of group at a failure of the network, transmission directions of optical signals are not accurately controlled.

For example, when added/dropped traffic is small in a node, the transmission apparatus (node) may pass optical signals of some wavelengths without terminating them to reduce costs of the transmission apparatus. In summary, an end node of a failure link passes a certain wavelength, while a node preceding the end node of the failure link terminates the wavelength.

In this case, when a switch message is transmitted in the unit of group, the preceding node is not enabled to switch transmission directions of optical signals, because the destination of the switch message is the end node of the failure link.

In this case, the end node of the failure link may just allow the optical signal transferred from the preceding node to pass therethrough and be transmitted to the failure link. That is, when the end node of the failure link passes the wavelength, the transmission directions of the optical signals are not correctly controlled.

The present disclosure is devised in consideration of such situation, and an object is to provide a transmission apparatus and a ring protection method that are capable of correctly controlling a transmission direction of an optical signal at an occurrence of a failure in a ring network including different transmission apparatuses, each terminating a different wavelength.

Preferred embodiments of the disclosed technology will be described below in detail with reference to attached drawings.

Embodiment 1

(Configuration of Ring Network)

Figure 1:
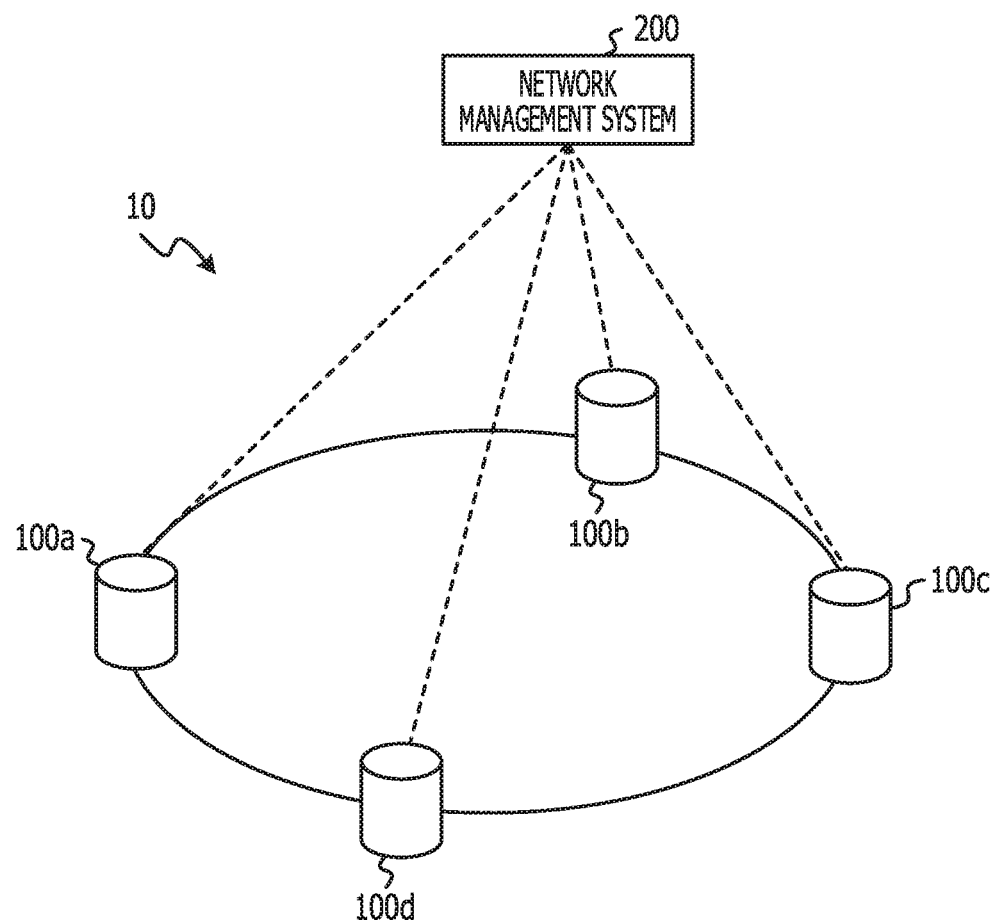

First, configuration of a ring network will be described. FIG. 1 is a view illustrating exemplary configuration of a ring network 10. As illustrated in FIG. 1, the ring network 10 includes a plurality of transmission apparatuses 100a to 100d and a network management system 200. When the transmission apparatuses 100a to 100d are not distinguished, they are simply referred to as transmission apparatus 100. The number of the transmission apparatuses is 4 in this example, but are not limited to this number. Hereinafter, the transmission apparatus may be referred to as a node.

The transmission apparatus 100a and the transmission apparatus 100b, the transmission apparatus 100b and the transmission apparatus 100c, the transmission apparatus 100c and the transmission apparatus 100d, and the transmission apparatus 100d and the transmission apparatus 100a are connected to each other via respective optical fibers to form the ring network 10. Optical signals having respective wavelengths are multiplexed and transmitted/received between the transmission apparatuses 100 in the ring network.

The transmission apparatuses 100 transmit and receive a signal and exchange information with the network management system 200.

The network management system 200 collects information on the ring network from each transmission apparatus 100 and transmits the collection results to each transmission apparatus 100.

(Configuration of Transmission Apparatus)

Figure 2:
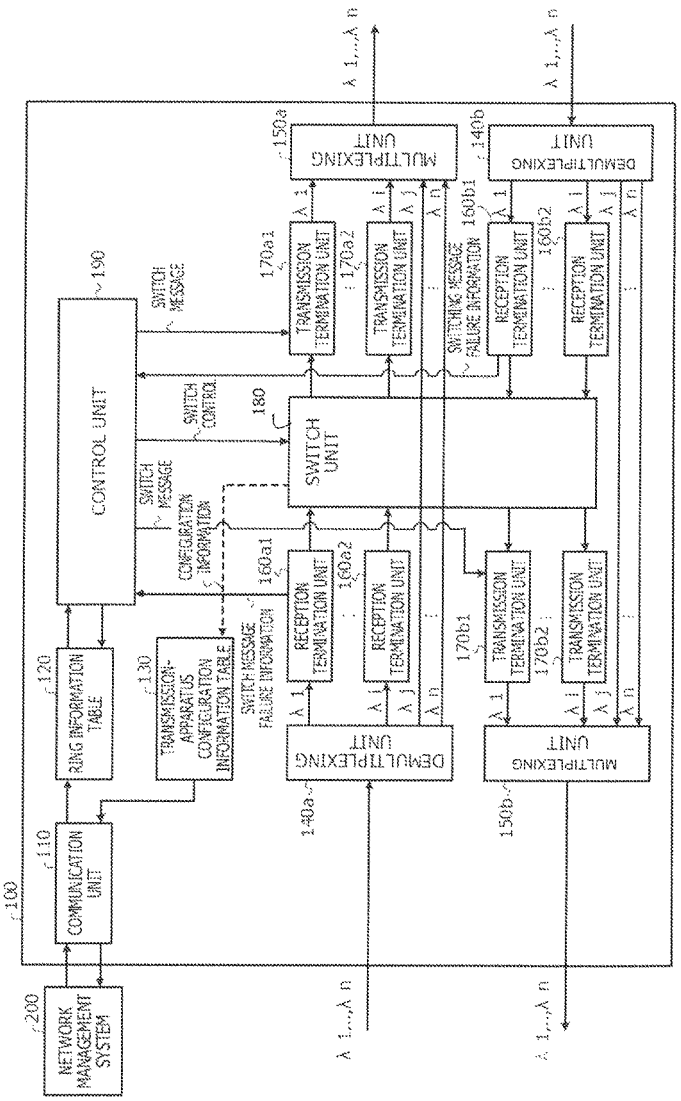

FIG. 2 is a view illustrating a first example of configuration of the transmission apparatus 100. The transmission apparatus 100 includes a communication unit 110, a ring information table 120, a transmission-apparatus configuration information table 130, demultiplexing units 140a, 140b, multiplexing units 150a, 150b, reception termination units 160a, 160b, transmission termination units 170a, 170b, a switch unit 180, and a control unit 190. The reception termination units 160a1, 160a2 are collectively referred to as 160a. Similarly, the reception termination unit 160b and the transmission termination units 170a, 170b also represent their respective functions. When they are not distinguished, they are designated by only figures (for example, reception termination unit 160).

The communication unit 110 transmits to the network management system 200 information on whether or not a transmission of each wavelength is terminated at the transmission apparatuses stored in the transmission-apparatus configuration information table 130. The communication unit 110 receives configuration information on each transmission apparatus 100 constituting the ring network 10 and ring configuration information created based on transmission lines, and reports them to the ring information table 120.

The ring information table 120 acquires the information on each transmission apparatus 100 constituting the ring network, which is acquired from the network management system 200, from the communication unit 110. The ring information table 120 has transmission line information in the transmission line (link) that interconnects the transmission apparatuses with a fiber or the like. Hereinafter, the transmission line that interconnects the transmission apparatuses may be referred to as a link.

The ring information table 120 is stored in a semiconductor memory device such as random access memory (RAM), read only memory (ROM), and flash memory, or a storage device such as a hard disc or an optical disc.

FIG. 3 illustrates an example of the ring information table 120. As for the transmission apparatus 100 in the ring information table in FIG. 3, the case where wavelength is terminated is indicated as "1", and the case where wavelength is not terminated is indicated as "0".

As for a transmission line 300, the case where no failure occurs is indicated as "0", and the case where a failure occurs is indicated as "−1". The transmission line 300 refers to a section located between the transmission apparatuses 100. For example, the transmission line 300a is located between the transmission apparatuses 100a and 100b, and represents the transmission line between the transmission apparatuses 100a and 100b. In the configuration of the ring network 10, the transmission line 300d is located between the transmission apparatus 100d and the transmission apparatus 100a, and represents the transmission line between the transmission apparatus 100d and the transmission apparatus 100a. In a single failure, it is possible to perform protection processing without information on the transmission line 300. However, in multiple failures, it is not possible to perform protection processing and thus, the information is used. This problem will be described in Embodiment 2.

The transmission-apparatus configuration information table 130 is updated by acquiring information (configuration information) from the switch unit 180 on whether or not each wavelength is terminated in the transmission apparatus 100, and the communication unit 110 informs the network management system 200 of the result. FIG. 4 illustrates an example of the transmission-apparatus configuration information table 130.

The transmission-apparatus configuration information table 130 is stored in a semiconductor memory device such as read only memory (RAM), read only memory (ROM), and flash memory, or a storage device such as a hard disc or an optical disc.

The demultiplexing unit 140 demultiplexes a multiplexed signal inputted to the transmission apparatus 100 into signals of respective wavelengths, and transmits them. The demultiplexing unit 140 includes AWG, for example.

The multiplexing unit 150 multiplexes signals of wavelengths including wavelengths inputted from the transmission termination unit 170 and unterminated wavelengths, and transmits them. The multiplexing unit 150 includes AWG, for example.

The reception termination unit 160 performs optical-electrical conversion on signal lights of wavelengths demultiplexed by the demultiplexing unit 140, and if an automatic protection switching (APS) signal contains the switch message, the reception termination unit 160 informs the control unit 190 of the switch message. Other information is transmitted to the switch unit 180. The reception termination unit 160 includes a photo diode, an ASIC, or the like, for example.

The transmission termination unit 170 performs electrical-optical conversion on a signal inputted from the switch unit 180 and transmits it to the multiplexing unit 150. At this time, when instructed to transmit a switch message by the control unit 190, the transmission termination unit 170 stores the information in the APS signal to make one wavelength (electrical-optical conversion). The transmission termination unit 170 includes a laser diode, an ASIC, or the like, for example.

The switch unit 180 switches the loop-back operation of each wavelength in response to an instruction of the control unit 190, and outputs it to the transmission termination unit 170 for each wavelength. The switch unit 180 includes an integrated circuit such as an application specific integrated circuit (ASIC) and a field programmable gate array (FPGA).

When receiving a switch message and failure information from the reception termination unit, the control unit 190 updates the ring information table 120. The control unit 190 controls the switch unit 180 based on the updated ring information table 120. The control unit 190 issues an instruction to the transmission termination unit 170 when transmitting the information to another transmission apparatus 100.

The control unit 190 is implemented by a central processing unit (CPU) performing a predetermined program. The functions of the control unit 190 are implemented by using an integrated circuit such as an ASIC and FPGA.

Figure 5:
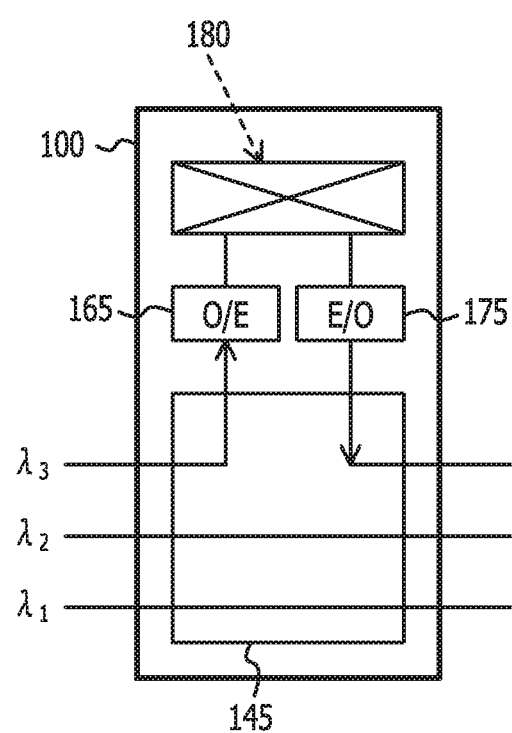

The transmission apparatus 100 may dynamically switch between terminated wavelength and passed wavelength. Referring to FIG. 5, the case where the transmission apparatus 100 dynamically switches between the passed wavelength and the terminated wavelength will be described below. FIG. 5 is a view illustrating a second example of the configuration of the transmission apparatus in Embodiment 1. As illustrated in FIG. 5, the transmission apparatus 100 includes a wavelength selection unit 145, an O/E (Optical/Electricity) conversion unit 165, an E/O (Electricity/Optical) conversion unit 175, and the switch unit 180. In FIG. 5, a part of the transmission apparatus 100, for example, the control unit 190, the demultiplexing unit 140, and the multiplexing unit 150, are omitted.

The wavelength selection unit 145 is a processing unit that selects a terminated wavelength among wavelengths of the optical signal demultiplexed by the demultiplexing unit 140. The wavelength selection unit 145 is capable of dynamically changing the terminated wavelength. The wavelength selection unit 145 includes a wavelength selection switch, for example.

For example, as illustrated in FIG. 5, the wavelength selection unit 145 selects an optical signal of wavelength $\lambda_3$, and outputs the signal to the O/E conversion unit 165. The wavelength selection unit 145 passes optical signals of wavelength $\lambda_1$ and wavelength $\lambda_2$. The wavelength selection unit 145 may select and terminate the wavelength $\lambda_1$ and the wavelength $\lambda_2$, and cancel selection of the wavelength $\lambda_3$ and pass the wavelength $\lambda_3$.

The O/E conversion unit 165 converts an optical signal of the wavelength $\lambda3$ selected by the wavelength selection unit 145 into an electric signal. The O/E conversion unit 165 outputs the converted electric signal to the switch unit 180. The switch unit 180 outputs an input signal to the E/O conversion unit 175 as an output signal. The E/O conversion unit 175 receives the electric signal corresponding to wavelength $\lambda_3$, which includes the switch message, from the switch unit 180. The E/O conversion unit 175 converts the received electric signal into the optical signal of wavelength $\lambda_3$, and outputs the converted signal.

(Processing of Transmission Apparatus)

Figure 6:
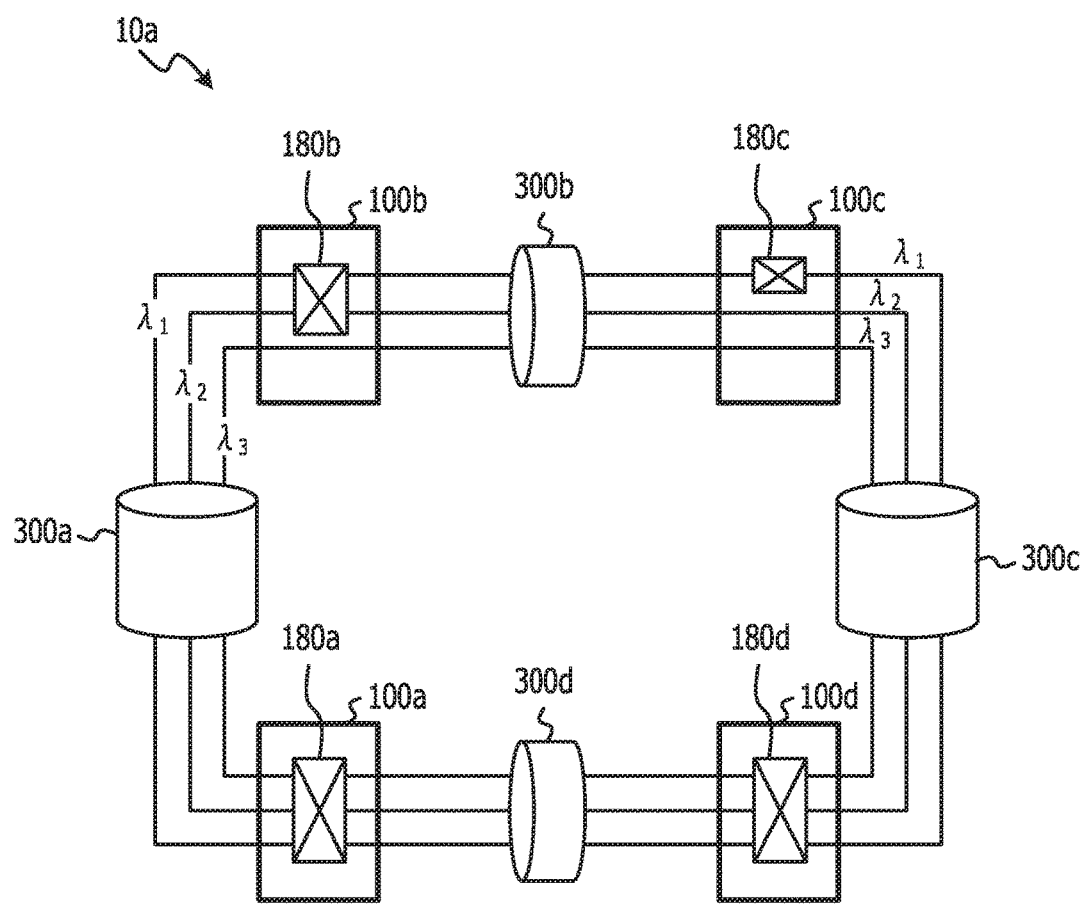

FIG. 6 is a view illustrating exemplary configuration of a ring network 10a. As illustrated in FIG. 6, the ring network 10a includes transmission apparatuses 100a to 100d and links 300a to 300d. The transmission apparatus 100a and the transmission apparatus 100b, the transmission apparatus 100b and the transmission apparatus 100c, the transmission apparatus 100c and the transmission apparatus 100d, and the transmission apparatus 100d and the transmission apparatus 100a are connected via the links 300a, 300b, 300c, and 300d, respectively, to form the ring network 10a.

Although the network management system 200 is omitted in the ring network 10a in FIG. 6, as illustrated in FIG. 1, each transmission apparatus 100 exchanges information with the network management system 200.

In FIG. 6, the wavelength $\lambda_1$ to wavelength $\lambda_3$ are individually illustrated. However, the optical signals of wavelength $\lambda_1$ to wavelength $\lambda_3$ are multiplexed between the transmission apparatuses 100. The demultiplexing unit 140, the multiplexing unit 150, and the transmission termination unit 170 are not illustrated.

In the transmission apparatuses 100 in FIG. 6, termination depends on the wavelength, and the switch units 180 are illustrated for the terminated wavelengths of the optical signals. The wavelength of the optical signal terminated by the switch unit 180 varies among the transmission apparatuses 100. For example, the switch unit 180a of the transmission apparatus 100a terminates the signals of wavelength $\lambda_1$ to wavelength $\lambda_3$. The switch unit 180b of the transmission apparatus 100b terminates the signals of the wavelength $\lambda_1$ and the wavelength $\lambda_2$, and passes the signal of the wavelength $\lambda_3$. The switch unit 180c of the transmission apparatus 100c terminates the signals of the wavelength $\lambda_1$, and passes the signals of the wavelength $\lambda_2$ and the wavelength $\lambda_3$. The switch unit 180d of the transmission apparatus 100d terminates the signals of the wavelength $\lambda_1$ to wavelength $\lambda_3$.

Figure 7:
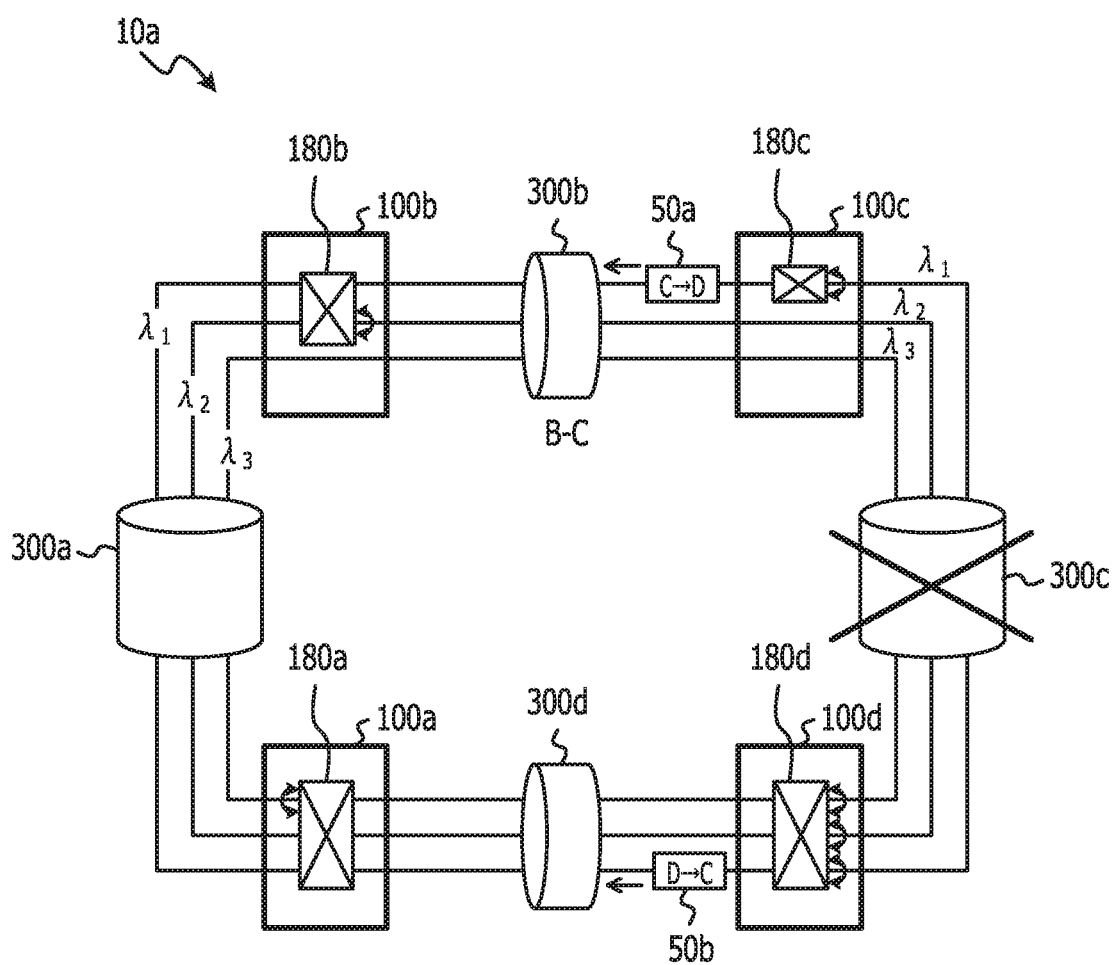

There will be described processing of the transmission apparatuses 100 executed when a failure occurs in the link 300c in the ring network 10a as illustrated in FIG. 7. Because of the failure, the ring network 10a is unable to transmit and receive an optical signal between the transmission apparatus 100c and the transmission apparatus 100d.

The transmission apparatus 100 performs group protection using a plurality of wavelengths as one group. The group protection is processing of regarding a plurality of wavelengths as one group and recovering from a failure as the group.

When a failure occurs in the ring network 10a, the transmission apparatus 100 on one end of the link with the failure transmits a switch message addressed to the transmission apparatus 100 on the other end of the link, in the reverse direction to the link 300 with the failure.

Each transmission apparatus 100, through which the switch message passes until the switch message reaches the transmission apparatus 100 on the other end of the link as destination, transfers the switch message to the next transmission apparatus 100. The switch message eventually arrives at the transmission apparatus 100 on the other end of the link as destination.

Using one wavelength, the transmission apparatus 100 on one end of the link transmits one switch message to the transmission apparatus 100. The transmission apparatus 100 on one end of link may select a wavelength to be terminated by the transmission apparatus 100 on both ends of the link with the failure, and transmit a switch message 50 using the selected wavelength. Each transmission apparatus 100 may terminate the wavelength to change the wavelength used in each link 300.

For example, when a failure occurs in the link 300c as illustrated in FIG. 7, using the optical signal of wavelength $\lambda_1$, the transmission apparatus 100c transmits the switch message 50a to the transmission apparatus 100d. The transmission apparatus 100d receives the switch message 50a via the transmission apparatus 100b and the transmission apparatus 100a. Meanwhile, using the optical signal of wavelength $\lambda_1$, the transmission apparatus 100d transmits the switch message 50b to the transmission apparatus 100c. The transmission apparatus 100c receives the switch message 50b via the transmission apparatus 100a and the transmission apparatus 100b. The transmission apparatus 100c or the transmission apparatus 100d transmits the switch message 50 using the wavelength $\lambda_1$, but may transmit the switch message 50 using another wavelength terminated by the transmission apparatus 100c and the transmission apparatus 100d.

After receiving the switch message 50, the transmission apparatus 100 updates information on disabled transmission to the link 300, based on the switch message 50. Upon updating, the transmission apparatus 100 refers to the ring information table 120, and determines whether or not the transmission apparatus 100 loops back the optical signal for each wavelength.

Next, there will be described a specific example of processing of looping back the optical signal in each transmission apparatus 100. The optical signals of wavelength $\lambda_1$ to wavelength $\lambda_3$ transmitted from the transmission apparatus 100d to the transmission apparatus 100c via the transmission apparatus 100a and the transmission apparatus 100b are processed as follows.

For example, the transmission apparatus 100c that receives the switch message 50b from the transmission apparatus 100d via the transmission apparatus 100a and the transmission apparatus 100b updates all wavelengths for the link 300c in the ring information table 120 to "−1" (transmission is disabled). Then, since the destination node of the switch message 50b is the transmission apparatus 100c itself, the transmission apparatus 100c loops back the optical signal of wavelength $\lambda_1$.

The transmission apparatus 100b that receives the switch message 50b from the transmission apparatus 100d via the transmission apparatus 100a updates all wavelengths in the link 300c in the ring information table 120 to "−1" (transmission is disabled). In the record of wavelength $\lambda_2$, since the value of the own node is "1", the value of the transmission apparatus 100c as the destination node is "0", and the value of the link 300c is "−1", the transmission apparatus 100b itself loops back the optical signal of wavelength $\lambda_2$.

The transmission apparatus 100a that receives the switch message 50b from the transmission apparatus 100d updates all wavelengths in the link 300c in the ring information table 120 to "−1". In the record of wavelength $\lambda_3$, since the value of the own node is "1", the value of the transmission apparatus 100b is "0", the value of the transmission apparatus 100c as the destination node is "0", and the value of the link 300c is "−1", the transmission apparatus 100a itself loops back the optical signal of wavelength $\lambda_3$.

As for the optical signals of wavelength $\lambda_1$ to wavelength $\lambda_3$ transmitted from the transmission apparatus 100c toward the transmission apparatus 100d via the transmission apparatus 100b and the transmission apparatus 100a, all values of the transmission apparatus 100d are "1", and the transmission apparatus 100d terminates all optical signals of wavelength $\lambda_1$ to wavelength $\lambda_3$. Thus, when receiving the switch message 50a, the transmission apparatus 100d loops back each of the optical signals of wavelength $\lambda_1$ to wavelength $\lambda_3$.

Figure 8:
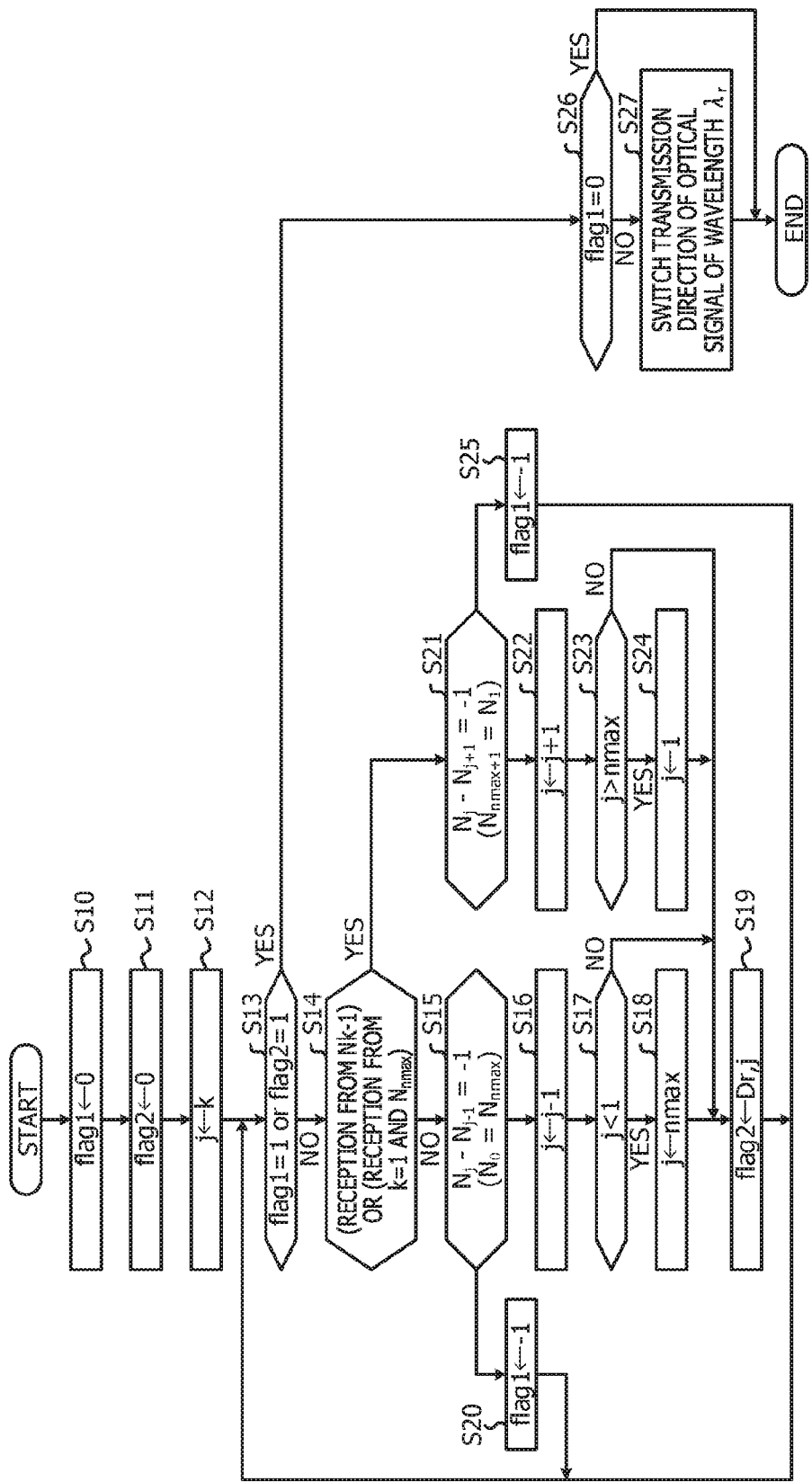

Referring to FIG. 8, there will be described processing of the control unit 190 of the transmission apparatus 100 in the case where a failure occurs in the ring network.

FIG. 8 illustrates an example of a flowchart of processing of the control unit 190. FIG. 8 is an example of a flowchart illustrating processing of wavelength $\lambda_r$ in the case where the transmission apparatus 100 receives the switch message.

The switch message for the transmission apparatus 100 as destination is terminated by each transmission apparatus. The transmission apparatus 100 executes the flowchart in FIG. 8 also for the wavelength other than the wavelength $\lambda_r$. The flow chart in FIG. 8 represents the transmission apparatus 100 using transmission apparatus number k (k=1, 2, 3, . . . nmax).

The link 300 is represented by two transmission apparatuses 100 such as $N_j$-$N_{j+1}$. $N_j$-$N_{j+1}$ indicates that a signal is transmitted from $N_j$ toward $N_{j+1}$.

The control unit 190 stores 0 in "flag1" and "flag2" (steps S10, S11). The "flag1" and the "flag2" each are a variable for storing values of the link 300 and the transmission apparatus 100, which are acquired from the ring information table 120. A value "−1" of "flag1" indicates that a failure occurs in the link 300 and transmission is disabled. A value "1" of "flag2" indicates that the transmission apparatus 100 terminates wavelength $\lambda_r$.

The control unit 190 stores a variable k in j (step S12). The values of flag1 and flag2 are checked (step S13). When both the values of flag1 and flag2 are 0 (step S13; No), the reception direction of the switch message 50 is checked (step S14).

When the switch message 50 is received from the $N_{k+1}$ (step S14; No), the state of the link 300 between $N_j$-$N_{j-1}$ is checked (step S15). Here, in the case of j=1, $N_{j-1}$ becomes $N_0$. However, in the configuration of the ring network, $N_{nmax}$ precedes $N_1$ and thus, $N_0$ is $N_{nmax}$ and $N_1$-$N_0$ becomes $N_1$-$N_{nmax}$.

In the case of $N_j$-$N_{j-1}$=0 (step S15; No (no failure)), j−1 is stored in j (step S16). It is determined whether or not j is smaller than 1 (step S17), and when j is smaller than 1 (step S17: Yes), nmax is stored in j (step S18), the processing proceeds to step S19. When j is 1 or more (step S17: No), the processing proceeds to step S19.

The control unit 190 stores a variable "Dr, j" in the variable "flag2" (step S19), the processing proceeds to step S13. The variable "Dr, j" is a variable corresponding to the transmission apparatus j in the record of the wavelength $\lambda_r$ in the ring information table 120. When the node j does not terminate the wavelength $\lambda_r$, the control unit 190 stores "0" extracted from the ring information table 120 in the variable "Dr, j". When the node j terminates the wavelength $\lambda_r$, the control unit 190 stores "1" extracted from the ring information table 120 in the variable "Dr, j".

In the case of $N_j$-$N_{j-1}$=−1 (step S15; Yes (failure)), "−1" is stored in flag1 (step S20), the processing proceeds to step S13.

When the signal is received from the $N_{k-1}$ in step S14 (step S14; Yes), the state of the link 300 between $N_j$-$N_{j+1}$ is checked (step S21). Here, in the case of j=nmax, $N_{j+1}$ becomes $N_{nmax+1}$. However, in the configuration of the ring network 10a, $N_{nmax}$ precedes $N_1$ and thus, $N_{nmax+1}$ is $N_1$ and $N_{nmax}$-$N_{nmax+1}$ becomes $N_{nmax}$-$N_1$.

In the case of $N_j$-$N_{j+1}$=0 (step S21; No (no failure)), "j+1" is stored in j (step S22). It is determined whether or not j is larger than nmax (step S23), and when j is larger than nmax (step S23: Yes), 1 is stored in j (step S24), the processing proceeds to step S19. When j is 1 or more (step S23: No), the processing proceeds to step S19.

In the case of $N_j$-$N_{j+1}$=−1 (step S21; Yes (failure)), "−1" is stored in flag1 (step S25), the processing proceeds to step S13.

In the case of flag1=−1 or flag2=1 in step S13 (Yes in step S13), the processing proceeds to step S26, it is determined whether or not flag1=0 (step S26).

In the case of flag1=0 (step S26; Yes), the processing is finished. In the case of flag1=−1 (step S26; No), the processing proceeds to step S27, the transmission direction of the optical signal of wavelength $\lambda_r$ is switched (step S27), the processing is finished.

In the case where the ring information table 120 has information only on the transmission apparatus 100, switching control is performed based on the failure information of the switch message 50 and the wavelength terminated by the transmission apparatus 100.

(Description of Switching Control in Ring Network)

In the BLSR (Bi-directional Line Switched Ring) used in this method, use for normal processing and use for protection are separated in the fiber. For example, when the wavelengths $\lambda_1$ to $\lambda_6$ are multiplexed, the wavelengths $\lambda_1$ to $\lambda_3$ are used for normal processing, and the wavelengths $\lambda_4$ to $\lambda_6$ are used for protection. When a failure occurs in the transmission line, the transmission apparatus 100 on one end of the failure transmission line converts the wavelength $\lambda_1$ into the protection wavelength $\lambda_4$, and transmits the converted signal of protection wavelength $\lambda_4$ to the other end of the failure transmission line in the reverse direction.

The transmission apparatus 100 that does not perform switching control transmits a signal as usual. For example, in the case where the transmission apparatus 100b transmits a signal of wavelength $\lambda_1$ to the transmission apparatus 100a via the transmission apparatuses 100c, 100d in FIG. 6, when a failure occurs in the transmission line 100c, as illustrated in FIG. 7, each transmission apparatus 100 performs switching control. Although only the wavelengths used for normal processing are illustrated in FIG. 6, the wavelengths for the protection are terminated in the same manner.

The transmission apparatus 100b transmits the signal of wavelength $\lambda_1$ as usual. The transmission apparatus 100c receives the signal of wavelength $\lambda_1$, converts the signal into a signal for protection (recovery) wavelength $\lambda_4$, and transmits the converted signal so as not to pass through the transmission line 300 with the failure.

The signal of protection wavelength $\lambda_4$ transmitted from the transmission apparatus 100c is transmitted to the transmission apparatus 100d, is converted into a signal of the wavelength $\lambda_1$ for normal processing at the transmission apparatus 100d, which is then transmitted to the transmission apparatus 100a.

As described above, when a failure occurs, the transmission apparatuses 100 on both ends of the transmission line 300 with the failure perform the same operation as usual using the protection wavelength.

(Description of ASP Byte Transferring Switch Message)

Referring to FIG. 9, an APS signal used to transfer the switch message 50 will be described. FIG. 9 is a view illustrating an example of the APS signal. The example in FIG. 9 conforms to the specification in ITU-TG.873.2. As illustrated in FIG. 9, ASP bytes includes four bytes of APS1 to APS4.

For example, APS1 of the APS bytes includes "Bridge Request". For example, when a failure occurs in the link 300 of the ring network 10a, the transmission apparatus 100 stores a signal "SF-R (Signal Fail Ring)" in "Bridge Request" of the APS byte.

APS2 includes "Destination Node ID". The transmission apparatus 100 stores ID (Identification) of the destination transmission apparatus 100 in "Destination Node ID" of APS2.

APS3 includes "Source Node ID". The transmission apparatus 100 stores ID of the source transmission apparatus 100 in "Source Node ID" of APS3.

Although "SF-R" is stored in "Bridge Request" of APS1 in this example, "SF-R" may be stored in another signal.

(Generation and Update of Ring Information Table)

Generation of the ring information table 120 will be described. The ring information table 120 includes information on whether or not the transmission apparatus 100 terminates the wavelength $\lambda_r$ and information indicating the state of each link 300.

In the ring network 10a as illustrated in FIG. 6, the network management system 200 collects transmission-apparatus configuration information of each transmission apparatus 100 from the each of the transmission apparatus 100a to 100d. For example, configuration information stored in the transmission-apparatus configuration information table 130 of each transmission apparatus 100 is extracted.

The configuration information on transmission apparatus, which is collected by the network management system 200, is combined with the initial state of each link 300 (in the initial state, all links have no failure (0)) to generate the initial ring information table 120. At this time, the transmission apparatus 100a, the link 300a (between the transmission apparatuses 100a and 100b), the transmission apparatus 100b, . . . are described in a ring-like manner as illustrated in FIG. 6 in the ring information table 120.

Next, specific processing of generating the ring information table 120 in each transmission apparatus 100 will be described. For example, given that the transmission apparatus 100b has the configuration as illustrated in FIG. 4, the transmission apparatus 100b stores configuration information"1, 1, 0" corresponding to the wavelength $\lambda_1$, wavelength $\lambda_2$, wavelength $\lambda_3$. The network management system 200 acquires the configuration information "1, 1, 0" from the transmission apparatus 100b via network.

The network management system 200 stores the acquired configuration information"1, 1, 0" on the transmission apparatus 100b in the row for the transmission apparatus 100b. Similarly, the network management system 200 acquire the configuration information from the transmission apparatuses 100a, 100c, and 100d, and performs processing in the same manner.

The network management system 200 transmits the configuration information acquired from the transmission apparatuses to the each transmission apparatus 100. When receiving new transmission-apparatus configuration information from the network management system 200, each transmission apparatus 100 updates information based on the received ring configuration information. When a failure occurs in the link 300 on updating, only information on the transmission apparatus 100 may be updated while keeping failure information of the link unchanged.

When a new transmission apparatus 100 is added to the ring network 10a, the network management system 200 adds rows for the new transmission apparatus 100 and an accompanying link 300 in the ring information table 120.

Next, updating of the link 300 will be described using a specific example. For example, as illustrated in FIG. 7, assume that the link 300c unable to make communication due to a failure. The transmission apparatus 100c that detects the failure (based on reception of no signal) transmits the switch message 50a to the transmission apparatus 100d without using the link 300c.

When the transmission apparatus 100b receives this signal, the transmission apparatus 100b finds that the transmission line 300c has a failure according to the switch message 50a. When finding that the link 300c has the failure, the transmission apparatus 100b updates the wavelength for the corresponding transmission line 300 in the ring information table (when all lines have the failure (such as cutoff), all wavelengths) to "−1".

Similarly, the transmission apparatus 100a also updates its table, when receiving the signal. The transmission apparatuses 100c, 100d on both ends of the transmission line 300c with the failure may update their tables when detecting a failure or when receiving the switch message 50.

In this manner, each transmission apparatus 100 and each link 300 in the ring information table 120 are updated.

As described above, in Embodiment 1, in the ring network 10a in which some wavelength is not terminated and passes the transmission apparatus 100, with even group protection, loopback can be correctly switched for each wavelength of each transmission apparatus. As compared with protection of each transmission apparatus 100, loads on transmission and reception processing of the switch message are reduced. For example, in the case of WDM transmission of 88 wavelengths, it is possible to set loopback with 1/88 of processings at maximum.

Embodiment 2

In Embodiment 2, a situation when double failures occur is described.

Figure 10A:
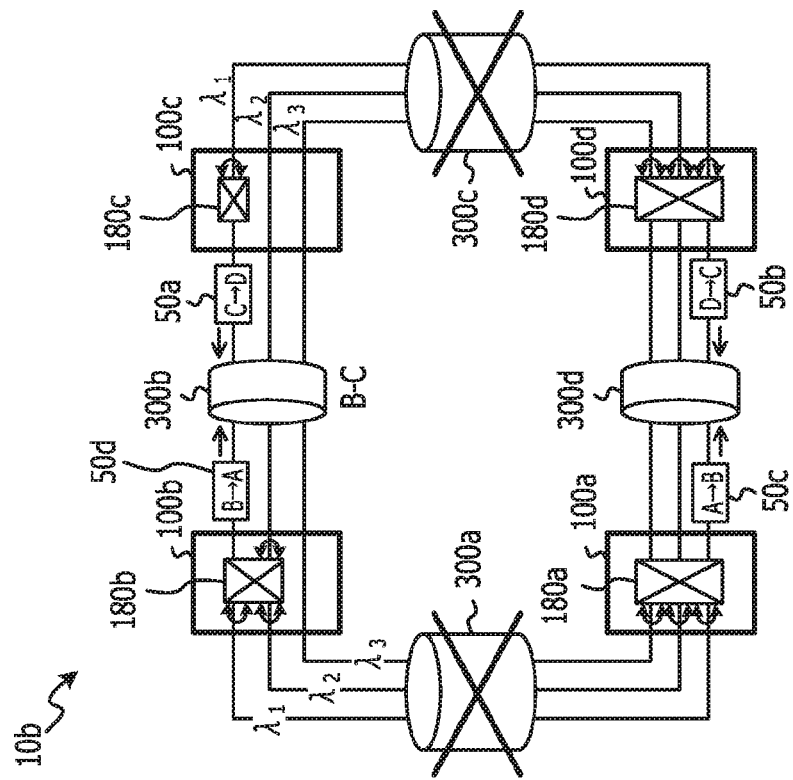
Figure 10B:
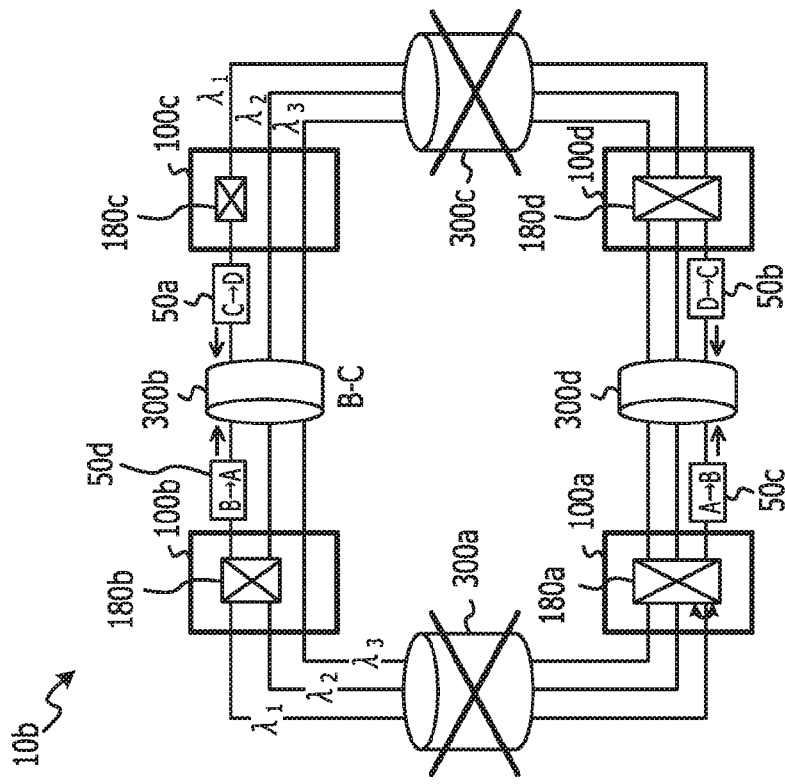

A ring network 10b in FIGS. 10A and 10B has the same configuration as the ring network 10a, and failures occurs in two links 300, link 300a and the link 300c.

In the ring network 10b, in the case where the ring information table 120 has only information on each transmission apparatus 100, when the switch message 50 is received, switching control as illustrated in FIGS. 10A and 10B is performed in consideration on only the transmission line that receives the switch message 50, and each transmission apparatus 100 is unable to perform correct switching. Therefore, information on each transmission line 300 is desired.

FIG. 10B illustrates switching control using information on the transmission line 300 as well. In FIG. 10B, the transmission apparatus 100b detects a failure in the transmission line 300a, updates all wavelengths in the link 300a of its own table to "−1", and transmits the switch message 50d in the order of the transmission apparatuses 100b, 100c, 100d, and 100a. The transmission apparatus 100b receives the switch message 50a addressed to the transmission apparatus 100d from the transmission apparatus 100c. When receiving the switch message 50a, the transmission apparatus 100b updates the transmission line 300c in the ring information table 120 to "−1".

The transmission apparatus 100b receives the switch message 50, updates information on the link 300 and then, make a determination on switching. At this time, in the ring information table 120, for example, values of the links 300a, 300c are "−1".

Since the transmission apparatus 100b has received the switch message 50a from the C to D, the transmission apparatus 100b checks each wavelength terminated by the transmission apparatus 100b, like checking the link 300a, then the transmission apparatus 100a, and so on. For example, the wavelength $\lambda_1$ is switched because the link 300a is "−1". Similarly, the wavelength $\lambda_2$ is switched because the link 300a is "−1", too.

However, in the state illustrated in FIG. 10B, since a failure occurs in the link 300a, the transmission apparatus 100b is unable to receive the switch message 50b from the transmission apparatus 100d to the transmission apparatus 100c (transmission direction: transmission apparatus 100d, 100a, 100b, 100c). Thus, the transmission apparatus 100b is unable to perform switching in the direction of the transmission apparatus 100c.

Accordingly, to perform correct switching even in the above case of the transmission apparatus 100b, each transmission apparatus 100 checks presence or absence of loopback for each wavelength $\lambda_r$ when transmitting the switch message 50.

For example, in the case illustrated in FIG. 10B, presence or absence of loopback is searched in the transmission direction using information in the ring information configuration table 120, before the transmission apparatus 100b transmits the switch message 50d. In the transmission apparatus 100b, the link 300b, the transmission apparatus 100c, . . . are searched. In the transmission apparatus 100b, the wavelength $\lambda_1$ is not switched because the link 300b is "0", and the transmission apparatus 100c is "1". The wavelength $\lambda_2$ is switched because the link 300b is "0", the transmission apparatus 100c is "0", and the link 300c is "−1".

Figure 11:
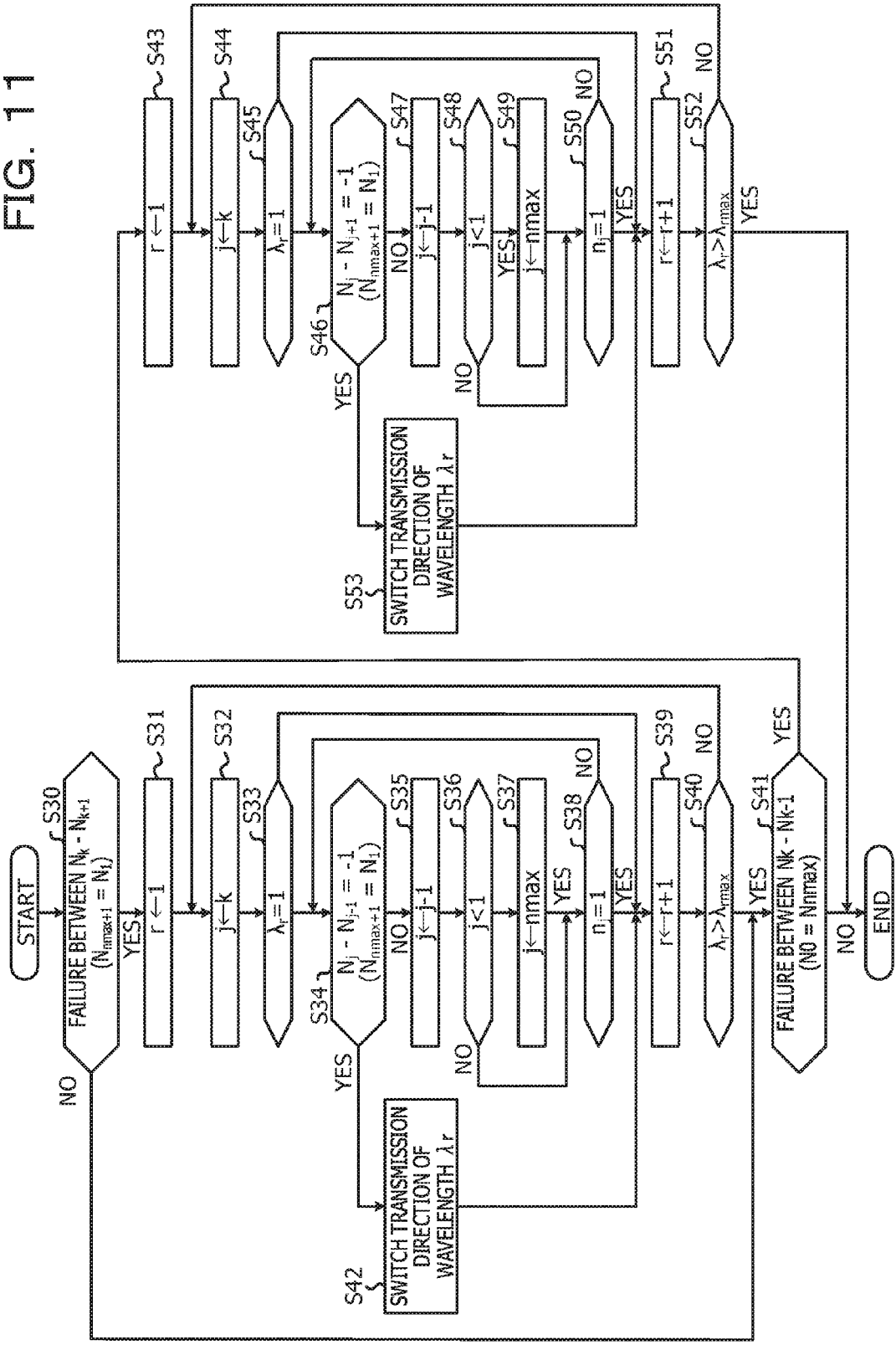

Referring to an example of flowchart in FIG. 11, a method of setting loopback before the transmission apparatus 100 transmits the switch message 50. It is determined whether or not there is a failure between $N_k$ and $N_{k+1}$ or between $N_k$ and $N_{k-1}$. (step S30, step S41). Here, $N_k$ denotes the transmission apparatus 100, and k is a number of the own node. The own node number is applied to the ring network 10b in which the transmission apparatuses 100 are connected to each other in a ring-like manner in the order of 1, 2, 3, . . . , nmax.

When no failure occurs (step S30 and step S41; No), the processing is finished. However, in FIG. 11, processing between $N_k$ and $N_{k+1}$ is finished and then, processing between $N_k$ and $N_{k-1}$ is executed. Thus, when the result in step S30 is No, the processing proceeds to step S41. The processing between $N_k$ and $N_{k-1}$ may be executed first.

When a failure between $N_k$ and $N_{k+1}$ is detected (step S30; Yes), "1" and "k" are stored in r and j, respectively (step S31, step S32), it is determined whether or not a transmission apparatus N; terminates $\lambda_r$ (step S33). When $\lambda_r$ is terminated (step S33; Yes), the state of the transmission line 300 between N; and $N_{j-1}$ is checked (step S34). Here, in the case of j=1, $N_{j-1}$ becomes $N_0$. However, in the configuration of the ring network, $N_{nmax}$ precedes $N_1$ and thus, $N_0$ is $N_{nmax}$ and $N_1$-$N_0$ becomes $N_1$-$N_{nmax}$.

In the case of $N_j$-$N_{j-1}$=0 (step S34; No (no failure)), j−1 is stored in j (step S35). It is determined whether or not j is smaller than 1, (step S36). When j is smaller than 1 (step S36; Yes), nmax is store in j (step S37), the processing proceeds to step S38. When j is 1 or more (step S36; No), the processing proceeds to step S38.

It is determined whether or not the transmission apparatus N; terminates the wavelength $\lambda_r$ (step S38). When the transmission apparatus N; does not terminates the wavelength $\lambda_r$ (No in step S38), the processing proceeds to step S34. When the transmission apparatus $N_j$ terminates the wavelength $\lambda_r$, the processing proceeds to step S39.

In the case of $N_j$-$N_{j-1}$=−1 (step S34; Yes (failure)), the transmission direction of the optical signal of wavelength $\lambda_r$ is switched (step S42), and the processing proceeds to step S39.

To determine presence or absence of switching of the next wavelength, r+1 is stored in r (step S39). It is determined whether or not the wavelength is used for the stored wavelength (step S40).

When the stored wavelength is used (step S40; No), the processing proceeds to step S32. When the stored wavelength is not used (step S40; Yes), the processing of the failure between $N_k$ and $N_{k+1}$ is finished, and the processing proceeds to step S41. However, when processing in step S41 and subsequent steps is performed, the processing before transmission is finished.

When a failure between $N_k$ and $N_{k-1}$ is detected (step S41; Yes), 1 and k are stored in r and j, respectively (step S43, step S44), it is determined whether or not the transmission apparatus terminates the wavelength $\lambda_r$ (step S45). When the transmission apparatus terminates $\lambda_r$ (step S45; Yes), the state of the transmission line between N; and $N_{j+1}$ is checked (step S46). Here, in the case of j=$N_{nmax}$, $N_{j+1}$ becomes $N_{nmax+1}$. However, in the ring network, $N_{nmax}$ precedes $N_1$ and thus, $N_{nmax+1}$ is $N_1$, and $N_{nmax}$-$N_{nmax+1}$ becomes $N_{nmax}$-$N_1$.

In the case of $N_j$-$N_{j+1}$=0 (step S46; No (no failure)), j+1 is stored in j (step S47). It is determined whether or not j is larger than nmax (step S48), and when j is larger than nmax (step S48; Yes), 1 is stored in j (step S49), the processing proceeds to step S50. When j is nmax or less (step S48; No), the processing proceeds to step S50.

It is determined whether or not the transmission apparatus N; terminates the wavelength $\lambda_r$ (step S50). When the transmission apparatus N; does not terminate the wavelength $\lambda_r$ (step S50; No), the processing proceeds to step S46. When the transmission apparatus $N_j$ terminates the wavelength $\lambda_r$, the processing proceeds to step S51.

In the case of $N_j$-$N_{j+1}$=−1 (step S46; Yes (failure)), the transmission direction of the optical signal of wavelength $\lambda_r$ is switched (step S53), the processing proceeds to step S51.

To determine presence or absence of switching of the next wavelength, "r+1" is stored in r (step S51). It is determined whether or not the wavelength is used for the stored wavelength (step S52).

When the wavelength $\lambda_r$ is used (step S52; No), the processing proceeds to step S44. When the stored wavelength is not used (step S52; Yes), processing of the failure of $N_k$-$N_{k+1}$ is finished to finish processing. However, when processing in step S41 and subsequent steps is executed first, the processing proceeds to step S32.

As described above, by determining presence or absence of loopback at transmission, proper loopback can be achieved.

Next, a method of reducing malfunction in protection will be described. As described above, in the BLSR used in this method, use for normal processing and use for protection are separated in the fiber.

At occurrence of multiple failures, a signal may not be transmitted from the source transmission apparatus 100 to the destination transmission apparatus 100, and the transmission apparatus 100 in between performs loopback. To reduce malfunction at this time, the operation referred to as Squelch is performed based on the APS signal.

Squelch means a function of blocking noise and unnecessary transmission from the party at the other end to put into information-free state.

Use of squelch reduces malfunction that a signal is transmitted to the transmission apparatus 100 other than the destination transmission apparatus 100 at multiple failures.

As described above, in Embodiment 2, in the ring network 10b in which some wavelength is not terminated and passes the node, correct protection is achieved for each wavelength even at double failures.

Embodiment 3

Figure 12:
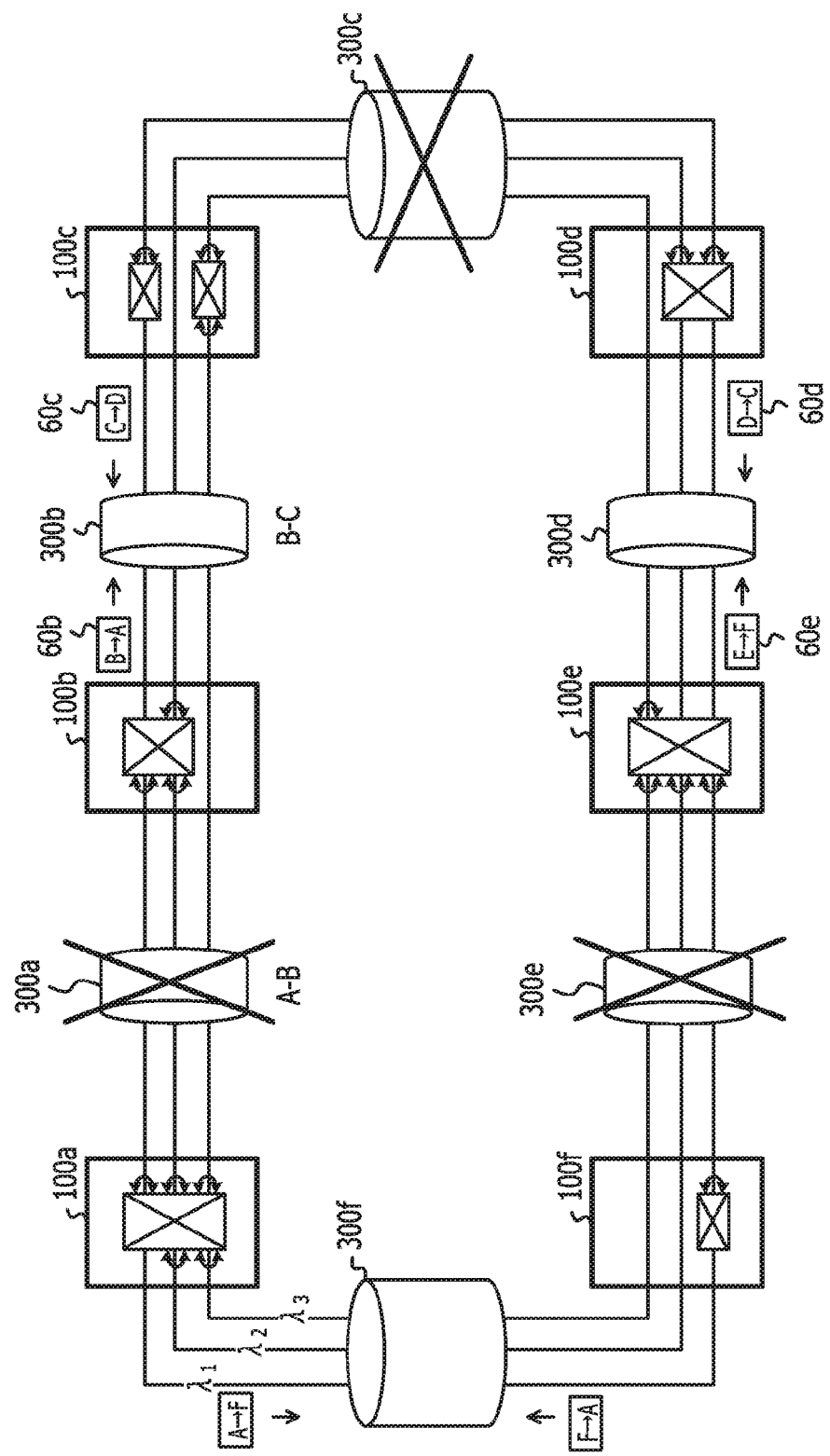

Embodiment 2 describes a protection method in the case of double failures. Embodiment 3 describes processing at triple failures, and application at multiple failures. A ring network 10c illustrated in FIG. 12 has triple failures. In the ring network 10c in FIG. 12, the transmission apparatus 100a to 100f are connected to each other in a ring-like manner, and the transmission apparatuses 100 are connected to each other via the link 300. Although FIG. 12 illustrates three wavelengths, the number of wavelength is not limited to three. Although the wavelengths are separately illustrated, signals having the respective wavelengths are multiplexed and transmitted between the transmission apparatuses 100.

FIG. 12 illustrates the state where failures occur in the links 300a, 300c, and 300e in the ring network 10c.

The ring information table 120 in the transmission apparatus 100b in the state illustrated in FIG. 12 becomes the table as illustrated in FIG. 13A. When detecting the failure in the link 300a, the transmission apparatus 100b updates the link 300a of the ring information table 120 of its own node to "−1".

When receiving a switch message 60c from the transmission apparatus 100c, the transmission apparatus 100b update the link 300c to "−1", and determines presence or absence of loopback of the wavelengths $\lambda_1$, $\lambda_2$ terminated by the transmission apparatus 100b. Since the link 300a is "−1" in the ring information table 120 of the transmission apparatus 100b illustrated in FIG. 13A, the transmission apparatus 100b set loopback to all of the terminated wavelengths.

Before transmission of a switch message 60b, the transmission apparatus 100b set loopback of the wavelength $\lambda_2$ by referring to the ring information table 120 of the transmission apparatus 100b in FIG. 13A on presence or absence of switching in the transmission direction.

When detecting a failure in the link 300e, the transmission apparatus 100e updates the link 300e in the ring information table 120 of the own node to "−1". When receiving a switch message 60d from the transmission apparatus 100d, the transmission apparatus 100e updates the link 300c to "−1", and determines presence or absence of loopback of the wavelength $\lambda_1$ to $\lambda_3$ terminated by the transmission apparatus 100e. Since the link 300e in the ring information table 120 of the transmission apparatus 100e in FIG. 13B is "−1", loopback is set.

Before transmission of a switch message 60e, the transmission apparatus 100e set loopback of the wavelength $\lambda_3$ by referring to the ring information table 120 of the transmission apparatus 100b in FIG. 13B on presence or absence of switching in the transmission direction.

The ring information tables 120 in FIGS. 13A and 13B are partially different from each other. However, the tables in the transmission apparatuses 100b and 100e each are searched between the link 300a and the link 300c, and between the link 300c and the link 300e, causing no problem.

As described above, the protection method described in Embodiment 2 can be applied to triple failures, that is, multiple failures.

Therefore, at multiple failures, it is possible for each transmission apparatus to accurately perform protection processing for each wavelength.

Embodiment 4

In Embodiment 2 or 3, the states of the link 300 and the transmission apparatus 100 are stored in the table to set presence or absence of switching at multiple failures.

In Embodiment 4, information on the link 300 is not stored in the table, and presence or absence of switching is determined on reception of the switch message 50 based on the failure detected by its own node and failure information in the switch message 50.

For example, in the ring network 10b with double failures as illustrated in FIGS. 10A and 10B, each transmission apparatus 100 has a ring information table 120a illustrated in FIG. 14. The ring information table 120a indicates wavelengths terminated by each transmission apparatus 100.

Switching performed by the transmission apparatus 100d at this time is described. When receiving a switch message 50c from the transmission apparatus 100a, the transmission apparatus 100d determines whether or not other transmission apparatuses 100 terminate each wavelength to the transmission line with failure, based on failure information on the link 300c detected by its own node, and failure information on the link 300a indicated by the switch message.

The transmission apparatus 100d finds that since the link 300c is a failure link, all wavelengths are not terminated by the other transmission apparatuses 100 before the failure.

Therefore, the transmission apparatus 100d performs switching of the direction toward the transmission apparatus 100c.

In consideration of the case where there are no wavelength to be terminated except for itself, like the wavelength $\lambda_2$ in the transmission apparatus 100b, proper support can be achieved by determining presence or absence of switching in the reception direction as well, at reception of the switch message. Therefore, only information on the transmission apparatus 100, correct switching as illustrated in FIG. 10B is enabled.

As described above, Embodiment 4 enables correct switching using the switch message and information on the link 300 with the failure.

Although the preferred embodiments of the ring network has been described, the present invention is not limited to the embodiments, and it should be understood that various changes and alternations could be made by those skilled in the art based on the subject matter of the invention that recited in CLAIMS and disclosed Embodiments of the Invention, and such changes and alternations fall within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus being one of a plurality of transmission apparatuses included in a ring network, the transmission apparatus comprising:
    at least one memory storing wavelength termination information;
    at least one demultiplexer;
    at least one multiplexer;
    a switch, which includes at least one optical-electrical (O/E) converter that performs O/E conversion and at least one electrical-optical (E/O) converter that performs E/O conversion, configured to:
        transmit, by the at least one E/O converter to the at least one multiplexer, each of a first plurality of optical signals received, by the at least one demultiplexer to the at least one O/E converter, from a first transmission apparatus to a second transmission apparatus, each of the first plurality of optical signals having each of a plurality of wavelengths, the first transmission apparatus and the second transmission apparatus being included in the plurality of transmission apparatuses, the first transmission apparatus being one adjacent transmission apparatuses of the transmission apparatus in the ring network, the second transmission apparatus being another adjacent transmission apparatuses of the transmission apparatus in the ring network; and
    a processor, coupled to the at least one memory, configured to:
        receive, by the at least one demultiplexer to the at least one O/E converter, a message from the first transmission apparatus, the message being for setting loopback for at least one wavelength in the ring network, the message being transmitted when a failure of at least one optical signal having the at least one wavelength is detected in a link of the ring network, the at least one wavelength being included in the plurality of wavelengths; and set a loopback to the switch based on the message and the wavelength termination information, the loopback being set for a wavelength of the at least one wavelength
    when an optical signal having the wavelength is terminated by the switch and converted to an electrical signal by the at least one O/E converter and
    when the optical signal having the wavelength is not terminated and not converted to an electrical signal by any of transmission apparatuses among the plurality of transmission apparatuses from the second transmission apparatus to a transmission apparatus before the link in which the failure is detected,
wherein after the loopback is set for the wavelength, when receiving, by the at least one demultiplexer to the at least one O/E converter, an optical signal having the wavelength from the first transmission apparatus, the switch is configured to
    switch, by the at least one E/O converter, the wavelength of the received optical signal from the wavelength to a different wavelength and
    transmit, by the at least one E/O converter to the at least one multiplexer, an optical signal, corresponding to the received optical signal, having the different wavelength to the first transmission apparatus.

2. The transmission apparatus according to claim 1, wherein
the loopback is not set for another wavelength of the at least one wavelength
    when an optical signal having the another wavelength is not terminated by the switch and converted to an electrical signal by the at least one O/E converter or
    when the optical signal having the another wavelength is terminated and converted to an electrical signal by at least one transmission apparatus among the plurality of transmission apparatuses from the second transmission apparatus to the transmission apparatus before the link in which the failure is detected.

3. The transmission apparatus according to claim 1, wherein
the switch is further configured to transmit, by the at least one E/O converter to the at least one multiplexer, each of a second plurality optical signals received, by the at least one demultiplexer to the at least one O/E converter, from the second transmission apparatus to the first transmission apparatus, each of the second plurality optical signals having each of the plurality of wavelengths.

4. The transmission apparatus according to claim 1, wherein
the processor is further configured to:
    transmit, by the at least one E/O converter to the at least one multiplexer, the message to the second transmission apparatus when detecting a failure in a link between the transmission apparatus and the first transmission apparatus, and
    transmit, by the at least one E/O converter to the at least one multiplexer, the message to the first transmission apparatus when detecting a failure in a link between the transmission apparatus and the second transmission apparatus.

5. The transmission apparatus according to claim 1, wherein
the message is included in automatic protection switching (APS) signal.

6. The transmission apparatus according to claim 1, wherein
the message is a message for group protection so that the at least one wavelength is group.

7. A network control method performed in one of a plurality of transmission apparatuses included in a ring network, the one of the plurality of transmission apparatuses has at least one memory storing wavelength termination information, at least one demultiplexer, at least one multiplexer, a switch, which includes at least one optical-electrical (O/E) converter that performs O/E conversion and at least one electrical-optical (E/O) converter that performs E/O conversion, and a processor which is coupled to the at least one memory, the network control method comprising:
transmitting, by the at least one E/O converter to the at least one multiplexer, each of a first plurality of optical signals received, by the at least one demultiplexer to the at least one O/E converter, from a first transmission apparatus to a second transmission apparatus, each of the first plurality of optical signals having each of a plurality of wavelengths, the first transmission apparatus and the second transmission apparatus being included in the plurality of transmission apparatuses, the first transmission apparatus being one adjacent transmission apparatuses of the transmission apparatus in the ring network, the second transmission apparatus being another adjacent transmission apparatuses of the transmission apparatus in the ring network; and
by the processor:
    receiving, by the at least one demultiplexer to the at least one O/E converter, a message from the first transmission apparatus, the message being for setting loopback for at least one wavelength in the ring network, the message being transmitted when a failure of at least one optical signal having the at least one wavelength is detected in a link of the ring network, the at least one wavelength being included in the plurality of wavelengths;
    setting a loopback to the switch based on the message and the wavelength termination information, the loopback being set for a wavelength of the at least one wavelength
        when an optical signal having the wavelength is terminated by the switch and converted to an electrical signal by the at least one 0/E converter and
        when the optical signal having the wavelength is not terminated and not converted to an electrical signal by any of transmission apparatuses among the plurality of transmission apparatuses from the second transmission apparatus to a transmission apparatus before the link in which the failure is detected; and
    after the loopback is set for the wavelength, when receiving, by the at least one demultiplexer to the at least one O/E converter, an optical signal having the wavelength from the first transmission apparatus,
        switching, by the at least one E/O converter, the wavelength of the received optical signal from the wavelength to a different wavelength and
        transmitting, by the at least one E/O converter to the at least one multiplexer, an optical signal, corresponding to the received optical signal, having the different wavelength to the first transmission apparatus.

8. The network control method according to claim 7, wherein the loopback is not set for another wavelength of the at least one wavelength
when an optical signal having the another wavelength is not terminated by the switch and converted to an electrical signal by the at least one O/E converter or
when the optical signal having the another wavelength is terminated and converted to an electrical signal by at least one transmission apparatus among the plurality of transmission apparatuses from the second transmission apparatus to the transmission apparatus before the link in which the failure is detected.

9. The network control method according to claim 7, further comprising:
transmitting, by the at least one E/O converter to the at least one multiplexer, each of a second plurality optical signals received, by the at least one demultiplexer to the at least one O/E converter, from the second transmission apparatus to the first transmission apparatus, each of the second plurality optical signals having each of the plurality of wavelengths.

10. The network control method according to claim 7, further comprising:
transmitting, by the at least one E/O converter to the at least one multiplexer, the message to the second transmission apparatus when detecting a failure in a link between the transmission apparatus and the first transmission apparatus; and
transmitting, by the at least one E/O converter to the at least one multiplexer, the message to the first transmission apparatus when detecting a failure in a link between the transmission apparatus and the second transmission apparatus.

11. The network control method according to claim 7, wherein
the message is included in automatic protection switching (APS) signal.

12. The network control method according to claim 7, wherein
the message is a message for group protection so that the at least one wavelength is group.

* * * * *